United States Patent Office 2,697,071
Patented Dec. 14, 1954

2,697,071

OIL BASE DRILLING FLUID CONTAINING LATEX

Harvey T. Kennedy, College Station, Tex., and Abraham J. Teplitz, Penn Township, Allegheny County, Pa., assignors to Gulf Research & Development Company, Pittsburgh, Pa., a corporation of Delaware No Drawing. Application May 28, 1951, Serial No. 228,766

3 Claims. (Cl. 252—8.5)

This invention relates to an oil base drilling fluid containing rubber latex.

In the rotary drilling of wells, a circulatory fluid is used to remove cuttings, seal off permeable formations, lubricate the bit, and perform other well-known functions. Aqueous base drilling muds are generally employed, but in many wells invasion of the pay zones by the water contained in such muds lowers the permeability of the formations, thus reducing their productivity. Aqueous muds also may cause serious sloughing of the walls in some boreholes due to the hydrating influence of the water on clay and shale sediments. Furthermore, in coring operations, water invasion destroys the value of the cores for estimating the potential producing capacities of the formations penetrated.

For these and other reasons it is frequently advantageous to employ special drilling fluids having a non-aqueous liquid phase and further characterized by the property of giving up only relatively small volumes of liquid to permeable formations under the action of differential pressures encountered in well operations. These fluids are usually made by mixing clays and other weighting materials with crude oil or one of its products. Such fluids also require the incorporation of thickening agents for maintaining the mud solids and drilling chips in suspension, together with other substances for controlling the fluid loss characteristics. Both of these functions are performed, in the case of the conventional aqueous muds, by the addition of bentonite or other hydratable materials.

Heretofore, however, attempts to regulate the viscosity and fluid loss properties in oil-base drilling fluids with a single ingredient have not been successful. In present day practice special asphaltic materials and various soaps are utilized in combination for those purposes. Rather large proportions of these additives are required, the asphaltic ingredient alone composing approximately twenty per cent of the weight of the oil phase. Because of the quantities of additives needed and the necessity for adjusting their proportions the control of the properties of these oil-base fluids is somewhat complicated.

An object which is achieved by our invention is to provide an oil-base drilling fluid in which relatively small proportions of crude or synthetic rubber latex serve to regulate viscosity and fluid loss properties of the fluid.

In accordance with our invention any one of a wide variety of crude oils, diesel oil, mineral seal oil, or other petroleum fractions may constitute the oil base. To this oil there is added rubber latex in the proportions of from 3.5 to 8.5 pounds per barrel of the oil, the oil being heated to approximately 150 degrees Fahrenheit. To increase the safety factor in handling, the oil selected should be sufficiently free of the more volatile constituents to assure a flash point not lower than 160 degrees Fahrenheit.

The mixture of heated oil and latex is next vigorously agitated to insure maximum swelling of the rubber particles, and conventional weighting materials are added for achieving density variations, such as ground oyster shells or other inexpensive form of calcium carbonate for fluids weighing up to eleven pounds per gallon, while for fluids of higher density barytes serve as a satisfactory weighting agent.

Examples of certain compositions and properties of drilling fluids embodying the principles of this invention are given in the following tabulation:

| Mud Weight, lb./gal | 9 | 11 | 15 |
|---|---|---|---|
| Composition: | | | |
| Oil, bbl. (39.2° A. P. I.) | .84 | .73 | .71 |
| Ground oyster shells, lb | 130.3 | 251.0 | |
| Barytes, lb | | | 424.2 |
| Rubber latex, 59% solids (lb./bbl.) | 7.014 | 3.990 | 3.948 |
| Properties: | | | |
| Viscosity, Stormer, cp | 125 | 139 | 132 |
| Initial Gel Strength, gm | 0 | 4 | 6 |
| 10 Min. Gel Strength, gm | 0 | 4 | 6 |
| 30 Min. Filtrate, ml | 0 | 0 | 0 |
| Cake thickness, in | 1/32 | 1/32 | 1/32 |

We have observed that the relatively small proportions of latex shown above imparted to these typical fluids the necessary suspending qualities and low fluid loss properties.

While the latex employed in compounding these drilling fluids was a common commercial dispersion of raw rubber, our invention contemplates the use of other commercial grades, as well as synthetic rubber latex. Also, although in the illustrative examples the use of a 39.2° A. P. I. Mid-Continent crude was employed, we may, as before stated use a wide variety of crudes or other petroleum fractions for the liquid phase.

What we claim is:

1. In a process for drilling a well with well drilling tools wherein there is circulated in the well an oil base drilling fluid containing mineral oil in mixture with sufficient rubber latex to regulate the viscosity and fluid loss properties of the fluid, the method of forming a protective coating on the wall of said well to decrease the loss of fluid into surrounding permeable formations under the action of differential pressures encountered in drilling, which comprises admixing with heated mineral oil an amount of rubber latex sufficient upon consequent swelling of the rubber particles to lower the fluid loss through the protective coating formed by circulation of said fluid in the well but insufficient to increase the viscosity of said fluid to such an extent as to render said fluid uncirculatable, and contacting said wall of the well with the resulting oil-latex fluid.

2. In a process for drilling a well with well drilling tools wherein there is circulated in the well an oil base drilling fluid containing mineral oil in mixture with sufficient rubber latex to regulate the viscosity and fluid loss properties of the fluid, the method of forming a protective coating on the wall of said well to decrease the loss of fluid into surrounding permeable formations under the action of differential pressures encountered in drilling, which comprises admixing with a mineral oil heated to approximately 150° F. rubber latex in the proportions of from 3.5 to 8.5 pounds of latex per barrel of oil, agitating the mixture to insure maximum swelling of the rubber particles, and circulating such fluid in a well in contact with the wall thereof.

3. In a process for drilling a well with well drilling tools wherein there is circulated in the well a weighted oil-base drilling fluid in mixture wtih sufficient rubber latex to regulate the viscosity of the fluid and adapt it to hold the added weighting material in suspension, the method of forming a protective coating on the wall of said well to decrease the loss of fluid into surrounding permeable formations and to provide a fluid column of high density in the well during drilling thereof, which comprises admixing with heated mineral oil an amount of rubber latex sufficient upon consequent swelling of the rubber particles to lower the fluid loss through the protective coating formed by circulation of said fluid in the well and to suspend an added weighting material but insufficient to increase the viscosity of said fluid to such an extent as to render said fluid uncirculatable, adding a weighting material to the admixed fluid and circulating said weighted fluid in a well in contact with the wall thereof.

References Cited in the file of this patent

UNITED STATES PATENTS

| Number | Name | Date |
|---|---|---|
| 2,232,421 | Workman | Feb. 18, 1941 |
| 2,390,450 | Morgan | Dec. 4, 1945 |
| 2,481,339 | Penfield | Sept. 6, 1949 |

FOREIGN PATENTS

| Number | Country | Date |
|---|---|---|
| 343,548 | Great Britain | Feb. 16, 1931 |